Aug. 12, 1952     T. J. BEURSKENS     2,606,593
COMBINATION BABY WALKER AND STROLLER
Filed May 21, 1948     2 SHEETS—SHEET 1
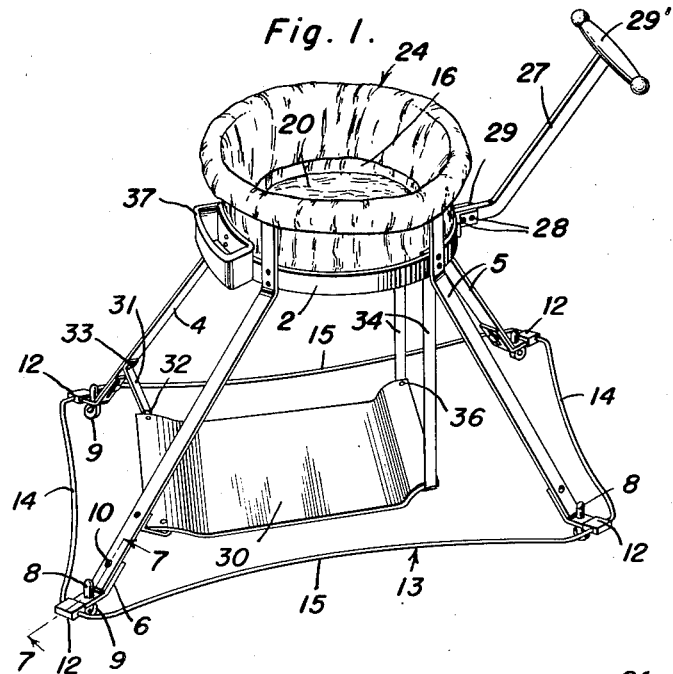
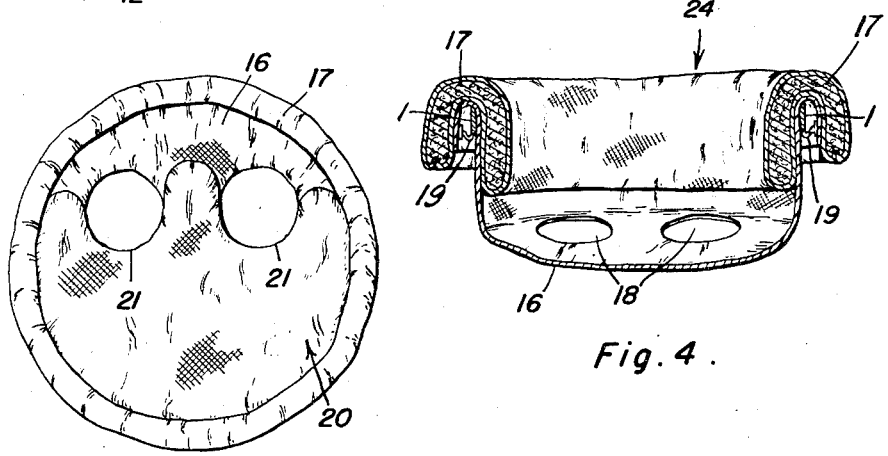
Thomas J. Beurskens
INVENTOR.

Aug. 12, 1952 T. J. BEURSKENS 2,606,593
COMBINATION BABY WALKER AND STROLLER
Filed May 21, 1948 2 SHEETS—SHEET 2
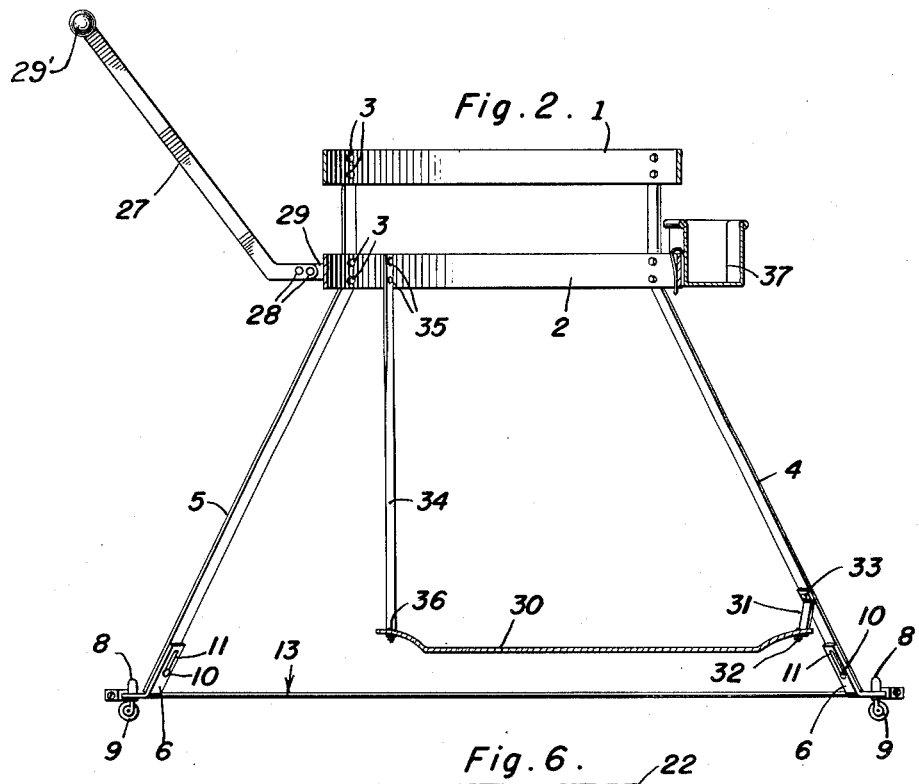
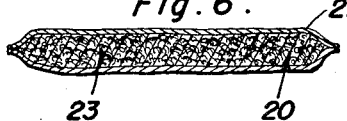
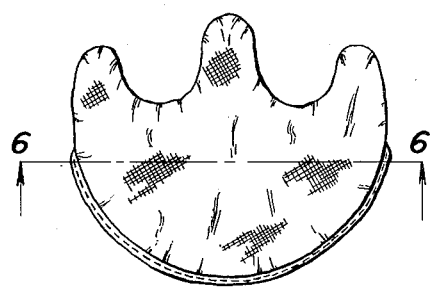
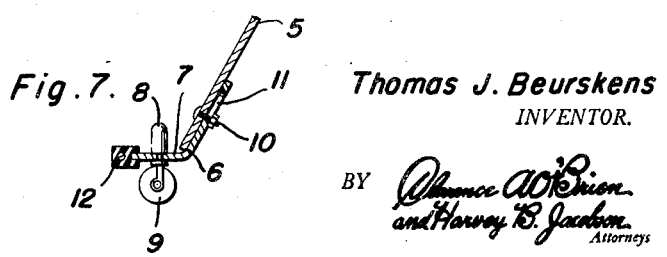
Thomas J. Beurskens
INVENTOR.

Patented Aug. 12, 1952

2,606,593

UNITED STATES PATENT OFFICE 2,606,593

COMBINATION BABY WALKER AND STROLLER

Thomas J. Beurskens, St. Louis, Mo.

Application May 21, 1948, Serial No. 28,387

6 Claims. (Cl. 155—24)

1

My invention relates to improvements in combined baby walkers and strollers.

The primary object of the invention is to provide a comfortable, inexpensive, device of the character indicated, with the aid of which a baby may safely learn to walk, or stand, and which is light in weight for easy propelling by the baby in walking, yet strong and durable, especially adapted for preventing the baby from falling out of the same or injuring itself therein, and is equipped for being quickly converted into a stroller with the feet of a baby seated therein held off the floor or ground.

Other and subordinate objects, within the purview of my invention, together with the precise nature of my improvements will be readily understood when the succeeding description and claims are read with reference to the drawings accompanying and forming part of the specification.

In said drawings:

Figure 1 is a view in perspective of my improved combined baby walker and stroller in a preferred embodiment thereof converted for use as a stroller;

Figure 2 is a view in longitudinal vertical section of the same drawn to a larger scale;

Figure 3 is a view in plan of the seat detached and with the seat pad positioned therein;

Figure 4 is a view in transverse section of the upper body confining band and the seat with the breast pad applied thereto;

Figure 5 is a view in plan of the seat pad detached;

Figure 6 is a view in transverse section taken on the line 6—6 of Figure 5;

Figure 7 is a fragmentary view in longitudinal vertical section taken on the line 7—7 of Figure 1 and drawn to a larger scale.

Referring to the drawings by numerals, my combined baby walker and stroller, as illustrated, comprises a pair of upper and lower, vertically spaced apart, body confining bands 1, 2 for confining the body of a baby (not shown) therein, and which are preferably of circular form and are connected together in spaced concentric relation by obtuse angled bar-like legs bolted thereto, as at 3, and forming front and rear pairs of legs 4, 5 diverging downwardly, relatively, in each pair from the lower band 2. The bands 1, 2 and the legs 4, 5 are preferably formed of light strong metal.

Obtuse angled, bar-like, extension brackets 6 are provided at the lower ends of the legs 4, 5 with outturned lower ends 7 having sockets 8

2 thereon for casters 9. The extension brackets 6 are detachably attached to the legs 4, 5 by bolts 10 extending through longitudinal slots 11 in said brackets so that said brackets may be adjusted longitudinally of said legs to extend the length of the legs and thereby vary the height of the body confining bands 1, 2 from the floor or ground for a purpose presently clear. The extension brackets 6 are also formed, preferably, of metal.

Rubber bumper blocks 12 are attached, in any suitable manner, to the lower ends 7 of the extension brackets 6 to straddle said ends and cushion impact of said brackets against furniture, woodwork, or the like.

A fender frame 13 of generally rectangular form with concave ends and sides 14, 15, surrounds the legs 4, 5 at the lower ends thereof and is suitably anchored at the corners of the frame in the bumper blocks 12, for instance, by extending the same into or through said blocks.

A bowl-like seat 16 of canvas, or the like, is provided to fit downwardly in the body confining bands 1, 2 with its edge turned outwardly and downwardly and suitably stiffened to form a rigid hooked rim 17 for straddling the upper body confining band 1 to suspend said seat therefrom. A pair of suitable leg openings 18 are provided in the bottom of the seat 16. Manually releasable resilient hooks 19 are provided in the hooked rim 17 of the seat 16 to engage the lower edge of the upper body confining band 1 and prevent the seat 16 from being accidentally detached from said band.

A segmental seat pad 20 is detachably fitted in the seat 16 with edge notches 21 for registering with the leg openings 18, said pad serving to hold the bottom of the seat 16 in substantially circular formation and to render the seat more comfortable and prevent the leg openings 18 from cutting or chafing the legs of a baby occupying the seat. The seat pad 20 may be formed of any suitable covering 22 with padding 23 therein.

A breast pad of annular form and inverted U-shape in cross-section, designated 24, is provided to fit over the hooked rim 17 of the seat 16 and to extend for a substantial distance downwardly into the seat and downwardly over the hooked rim 17 to prevent a baby occupying the seat 16 from injuring itself and to form a cushion in the seat 16 against which the baby may comfortably recline. The breast pad 24 may be formed of any suitable covering 25 with padding 26 therein and when placed over the rim 17 confines the same therein against spreading apart and thus holds the hooks 19 in engaging relation to the lower edge of the confining band 1 so that said rim 17 cannot be pulled through said band by the weight of the baby in said seat.

As so far described, the invention is adapted for use as a baby walker with a baby seated in the seat 16 with its legs inserted through the leg openings 18 and the height of the seat 16 from the floor being varied, as required, so that the baby may stand while grasping the breast pad 24 to walk while being partly suspended by the seat. The height of the seat 16 may be varied by varying the height of the body confining bands 1, 2 through adjustment, in the manner already described, of the bracket extensions 6. As the baby attempts to walk, the device is propelled over the floor on the casters 9, the fender frame 13 fending off obstructions, as will be clear. A particuar feature of my invention is that the breast pad 24, seat pad 20, and seat 16 may be easily detached for cleaning as may be required.

For converting the invention from a baby walker into a stroller, a handle bar 27 is provided for attachment at one end, by bolts 28 between a pair of lugs 29 suitably secured to the lower body confining band 2 intermediate the pair of rear legs 5, said handle bar inclining upwardly and outwardly from said band and being equipped with a hand-grip cross-bar 29'.

A foot-rest plate 30 of generally rectangular form is attached in suspended position at front corners thereof to the pair of front legs 4 by attaching bars 31 bolted to said corners as at 32 and to said legs, as at 33. Hanger bars 34 suspend said foot-rest plate 30 at the rear corners thereof from the lower body confining band 2 to which said bars are bolted, as at 35, with lower ends bolted to said plate, as at 36.

Obviously, with the handle bar 27 attached as described, together with the foot-rest plate 30, a baby may be seated in the seat 16 with its feet resting upon the foot-rest plate 30 and thereby kept off the floor, and the device may be pushed along the floor, or ground, easily and conveniently.

A suitable receptacle 37 for play things, or other articles, is attached to the lower body confining band 2 between the pair of front legs 4.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having thus described the invention, what is claimed as new is:

1. In a stroller device, a pair of vertically spaced annular bands for confining the body of the baby therein, supporting legs for said bands connecting the same together in spaced relation and diverging downwardly therefrom, relatively, to stabilize said bands, casters on the lower ends of said legs, a bowl-like flexible seat loosely fitting in said bands and being suspended from the upper band with bottom leg holes therein for extending the legs of a baby below the seat in position to walk, a foot-rest plate attached in suspended position between the supporting legs to keep the baby from walking and being detachable to permit the baby to walk and convert the device from a stroller into a baby walker, and a pusher handle on one band for use when said plate is attached to propel the device as a stroller.

2. In a device of the class described, a pair of vertically spaced annular bands for confining the body of a baby therein, supporting legs for said bands connecting the same together in spaced relation and diverging downwardly relatively to stabilize the bands, casters on the lower ends of said legs, a bowl-like flexible seat loosely fitting in said bands and being suspended from the upper band with bottom leg holes therein for extending the legs of the baby below the seat in position to walk, resilient bumpers on the lower ends of said supporting legs, and a fender frame surrounding said legs and attached to said bumpers.

3. In a device of the class described, a pair of vertically spaced annular bands for confining the body of a baby therein, supporting legs for said bands connecting the same together in spaced relation and diverging downwardly to stabilize the bands, casters on the lower ends of said supporting legs, a bowl-like flexible seat loosely fitting in the bands with bottom leg holes therein for extending the legs of a baby below the seat in position to walk, said seat having an annular rim of hook shape in cross-section for straddling the upper band to detachably suspend said seat therefrom, and means in said annular rim engaging the bottom edge of the upper band to prevent said annular rim from being pulled downwardly through the upper band by the weight of a baby in the seat.

4. In a device of the class described, a pair of vertically spaced annular bands for confining the body of a baby therein, supporting legs for said bands connecting the same together in spaced relation and diverging downwardly to stabilize the bands, casters on the lower ends of said supporting legs, a bowl-like flexible seat loosely fitting in the bands with bottom leg holes therein for extending the legs of a baby below the seat in position to walk, said seat having an annular rim of hook shape in cross-section for straddling the upper band to detachably suspend said seat therefrom, means in said annular rim engaging the bottom edge of the upper band to prevent said annular rim from being pulled downwardly through the upper band by the weight of a baby in the seat and an annular breast pad of U-shape in cross-section straddling said rim and confining the same against spreading apart to hold said means engaged with said edge of the upper band.

5. In a device of the class described, a pair of vertically spaced annular bands for confining the body of a baby therein, supporting legs for said bands connecting the same together in spaced relation and diverging downwardly to stabilize the bands, casters on the lower ends of said supporting legs, a bowl-like flexible seat loosely fitting in the bands with bottom leg holes therein for extending the legs of a baby below the seat in position to walk, said seat having an annular rim of hook shape in cross-section for straddling the upper band to detachably suspend said seat therefrom, a seat pad fitting in the bottom of said seat with edge notches for registering with said leg holes, and hooks in said annular rim engaging the bottom edge of the upper band to prevent said rim from being pulled through the upper band by the weight of a baby in said seat.

6. A seat structure for a baby and for attachment to an annular band comprising a bowl-like flexible seat with bottom leg openings for extending the legs of the baby therethrough, said seat having an annular rim of hook shape in cross-section adapted to fit over said band to suspend the seat therein, hooks in said annular rim engaging the bottom edge of said band to prevent said rim from being pulled through said band by the weight of a baby in said seat, an annular breast pad of U-shape in cross-section fitting over said rim and confining the rim therein against spreading apart to hold said hooks engaged with said band, and a seat pad fitting in the bottom of said seat with edge notches registering with said holes.

THOMAS J. BEURSKENS.

REFERENCES CITED

The following references are of record in the file of this patent:

UNITED STATES PATENTS

| Number | Name | Date |
|---|---|---|
| 1,475,442 | Manger | Nov. 27, 1923 |
| 2,308,626 | Reinholz | Jan. 19, 1943 |